(12) United States Patent
Chai et al.

(10) Patent No.: US 11,062,496 B2
(45) Date of Patent: Jul. 13, 2021

(54) MOTION MODELING METHOD AND DEVICE USING VIRTUAL JOINT SPHERE

(71) Applicant: CHUNG ANG UNIVERSITY INDUSTRY ACADEMIC COOPERATION FOUNDATION, Seoul (KR)

(72) Inventors: Young Ho Chai, Paju-si (KR); Seong Hun Kim, Anyang-si (KR)

(73) Assignee: CHUNG ANG UNIVERSITY INDUSTRY ACADEMIC COOPERATION FOUNDATION, Seoul (KR)

( * ) Notice: Subject to any disclaimer, the term of this patent is extended or adjusted under 35 U.S.C. 154(b) by 0 days.

(21) Appl. No.: 16/691,332

(22) Filed: Nov. 21, 2019

(65) Prior Publication Data

US 2021/0142545 A1    May 13, 2021

(30) Foreign Application Priority Data

Nov. 13, 2019  (KR) .......................... 10-2019-0144805

(51) Int. Cl.
*G06T 13/40* (2011.01)

(52) U.S. Cl.
CPC .................................. *G06T 13/40* (2013.01)

(58) Field of Classification Search
CPC ...................................................... G06T 13/00
See application file for complete search history.

(56) References Cited

U.S. PATENT DOCUMENTS

| 10,463,958 | B2 * | 11/2019 | Bentley | ................ | A63F 13/213 |
| 2006/0274070 | A1 * | 12/2006 | Herman | ................ | A63F 13/10 |
| | | | | | 345/474 |
| 2010/0182329 | A1 * | 7/2010 | Yamaguchi | ............. | G06T 13/40 |
| | | | | | 345/474 |

FOREIGN PATENT DOCUMENTS

| KR | 20150089980 A | 8/2015 |
| KR | 20150142796 A | 12/2015 |
| KR | 20170061294 A | 6/2017 |

\* cited by examiner

*Primary Examiner* — Chong Wu

(57) ABSTRACT

Disclosed herein is a motion modeling method and device using a virtual joint sphere. The motion modeling method using the virtual joint sphere includes (a) modeling a 3D virtual character, wherein the 3D virtual character sets a virtual joint sphere for each body part; and (b) forming a trajectory for a motion of a target body part of the 3D virtual character as a specific motion is performed on a surface of the virtual joint sphere assigned to the target body part, when reconstructing the motion of the 3D virtual character according to the specific motion.

13 Claims, 11 Drawing Sheets

FIG. 3

| Rotation Axis | Body part | Quaternion symbol |
|---|---|---|
| $c_0$ | World | --- |
| $c_1$ | Hips | $Q_1 = (1, 0, 0, 0), q_1$ |
| $c_2$ | Spine | $Q_2 = (1, 0, 0, 0), q_2$ |
| $c_4$ | Right Upper Arm | $Q_4 = (0.707, 0, 0, -0.707), q_4$ |
| $c_5$ | Right Lower Arm | $Q_5 = (1, 0, 0, 0), q_5$ |
| $c_6$ | Right Hand | $Q_6 = (1, 0, 0, 0), q_6$ |
| Right Hand Rotation = $<q_6 Q_6 q_5 Q_5 q_4 Q_4 q_2 Q_2 q_1 Q_1>$ | | |

MOTION MODELING METHOD AND DEVICE USING VIRTUAL JOINT SPHERE

CROSS-REFERENCE TO RELATED APPLICATION

This application claims the benefit of Korean Patent Application No. 10-2019-0144805, filed with the Korean Intellectual Property Office on Nov. 13, 2019, the disclosure of which is incorporated herein by reference in its entirety.

BACKGROUND

(a) Technical Field

The present invention relates to a motion modeling method and device using a virtual joint sphere.

(b) Background Art

The best method to understand and share human motion is to directly observe and communicate with a person who performs the motion while being in the same space as the person. However, if it is difficult to directly meet the person due to a considerable distance or it is required to share the motion with several persons, it is difficult to apply this method. Thus, a method of recording the motion and sharing the motion in the form of an image is most commonly used. The image is advantageous in that it is easy to understand an overall motion at a glance, but is disadvantageous in that it is difficult to grasp a subtle difference in the motion and to numerically compare the difference in a digital space.

In a motion capture region, data on human motion is measured using a sensor such as an Inertial Measurement Unit (IMU), and the data is reconstructed as an actual motion through 3D software. Key frame animation is most widely used for the motion reconstruction, and sets the key frame of the overall motion even without using sensor data and automatically calibrates a region between respective frames through an algorithm, thus allowing a natural motion to be configured. However, the motion reproduced through the key frame animation shows a slight difference from the actual motion. In the case of the actual motion, even if the same motion is repeated by the action of human's muscle and gravity, the result is not the same each time. Hence, the motion that is exactly implemented through an algorithm in the key frame animation does not match the actual motion. Furthermore, in the calibrating method through the algorithm, as the motion becomes complicated and longer, a difference between the motion implemented through the algorithm and the actual motion increases and a user's burden increases to calibrate the difference.

Labanotation is a motion recording method configured for delivering a choreography motion to multiple students. Just as music is recorded through a musical note, the motion is recorded by combining various symbols on a choreographic note and placing them according to body parts. It is possible to identify a change in wrist movement as well as changes in direction, angle, and height. Even if Labanotation uses the same choreographic score, motion is implemented by a choreographer's arbitrary interpretation. Therefore, unlike the intention of a person who records the choreographic score at first, everybody interprets the motion differently and consequently implements a different motion. This is problematic in that a change in small angle of 30 degrees or less may not be expressed, and all slight differences constituting the motion may not be recorded and transmitted.

SUMMARY OF THE DISCLOSURE

The present invention has been made in an effort to solve the above-described problems associated with prior art and to provide a motion modeling method and device, intended to model the motion of a motion capture-based 3D virtual character.

Furthermore, the present invention is to provide a motion modeling method and device, capable of visually displaying a trajectory according to the motion when modeling the motion.

According to one aspect of the invention, the present invention provides a motion modeling method of a 3D virtual character using a virtual joint sphere.

According to an embodiment of the invention, the motion modeling method using the virtual sphere may include (a) modeling a 3D virtual character, wherein the 3D virtual character sets a virtual joint sphere for each body part; and (b) forming a trajectory for a motion of a target body part of the 3D virtual character as a specific motion is performed on a surface of the virtual joint sphere assigned to the target body part, when reconstructing the motion of the 3D virtual character according to the specific motion.

The virtual joint sphere may divide a region at a predetermined angle around each of axes.

A contact point may include a plurality of directional regions, and the plurality of directional regions may be divided at a predetermined angle, and the plurality of divided directional regions may be displayed in the form of different visual information according to a direction of a direction vector for each body part.

The motion modeling method may further include, after the step (b), simultaneously moving the virtual joint sphere of a body part connected to a lower layer of a hierarchical structure of the target body part according to the motion of the target body part.

A trajectory may be formed on the surface of the virtual joint sphere assigned to the target body part by reflecting a rotation value of a trajectory of a body part of an upper layer connected to the target body part.

According to another embodiment of the invention, a motion modeling method using a virtual sphere may include (a) acquiring rotation data on each body part according to a specific motion from a sensor attached to a person's body part; and (b) forming a trajectory for a motion of a target body part of the 3D virtual character as a specific motion is performed on a surface of the virtual joint sphere assigned to the target body part, using the rotation data on each body part, when reconstructing the motion of the 3D virtual character according to the specific motion.

The motion modeling method may further include, before the step (a), deriving an initial correction value and a direction correction value using the rotation data acquired from the sensor in an initial pose, wherein the rotation data in the step (b) may be a motion rotation value to which the initial correction value and the direction correction value are applied.

The step (b) may include deriving a direction vector ($v_j'$) for each body part using a skeleton direction vector ($v_0$) of each body part in the initial pose and rotation data on each body part; and forming the trajectory by displaying a contact point meeting on the surface of the virtual joint sphere using the direction vector for each body part according to the specific motion.

According to another aspect of the invention, the present invention provides a motion modeling device of a 3D virtual character using a virtual joint sphere.

According to an embodiment of the invention, a modeling device may include a memory configured to store at least one command; and a processor configured to execute the command stored in the memory, wherein the command executed by the processor may perform (a) modeling a 3D virtual character, wherein the 3D virtual character sets a virtual joint sphere for each body part; and (b) forming a trajectory for a motion of a target body part of the 3D virtual character as a specific motion is performed on a surface of the virtual joint sphere assigned to the target body part, when reconstructing the motion of the 3D virtual character according to the specific motion.

According to another embodiment of the invention, a modeling device may include a memory configured to store at least one command; and a processor configured to execute the command stored in the memory, wherein the command executed by the processor may perform (a) acquiring rotation data on each body part according to a specific motion from a sensor attached to a person's body part; and (b) forming a trajectory for a motion of a target body part of the 3D virtual character as a specific motion is performed on a surface of the virtual joint sphere assigned to the target body part, using the rotation data on each body part, when reconstructing the motion of the 3D virtual character according to the specific motion.

An embodiment of the present invention provides a motion modeling method and device, thus modeling the motion of a motion capture-based 3D virtual character.

Furthermore, the present invention allows a trajectory to be visually displayed according to the motion when modeling the motion.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 3 is a diagram illustrating a motion tracking expression of a right-hand part in accordance with the embodiment of the present invention;

DETAILED DESCRIPTION

As used herein, the singular forms "a", "an", and "the" are intended to include plural forms as well, unless the context clearly indicates otherwise. It is to be understood that the terms "comprises" and/or "comprising", or "includes" and/or "including" when used in this specification, specify the presence of stated features, numbers, steps, operations, elements, components, and/or combinations thereof, but do not preclude the presence or addition of one or more other features, numbers, steps, operations, elements, components, and/or combinations thereof. Furthermore, the terms "part" and "module" described in this specification mean a unit for processing at least one function or operation, which may be implemented by hardware or software or by the combination of hardware and software.

Hereinafter, reference will now be made in detail to various embodiments of the present disclosure, examples of which are illustrated in the accompanying drawings and described below.

Figure 1:
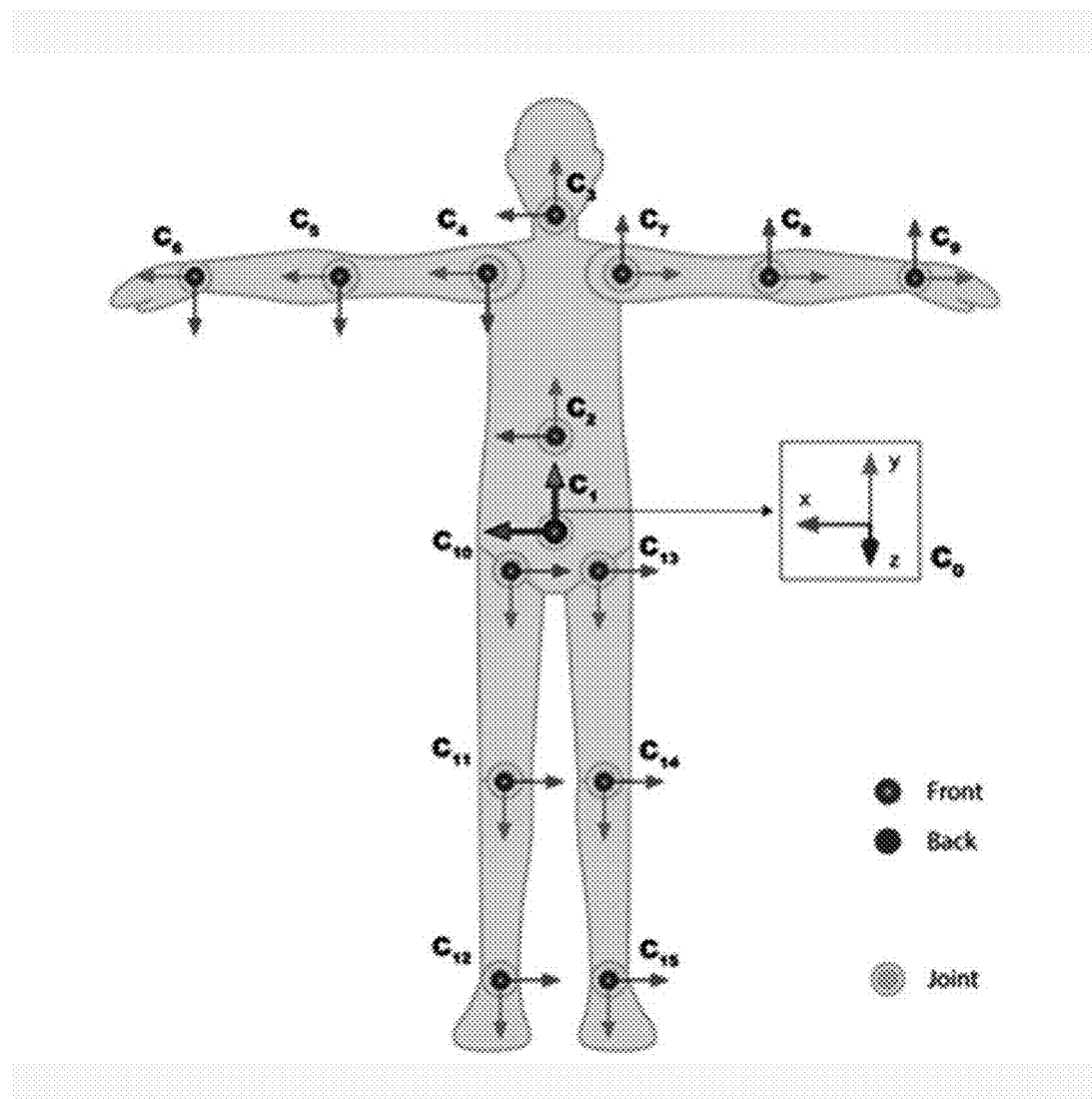
FIGS. 1 and 2 are diagrams illustrating a basic structure of a 3D virtual character in accordance with an embodiment of the present invention.
Figure 2:
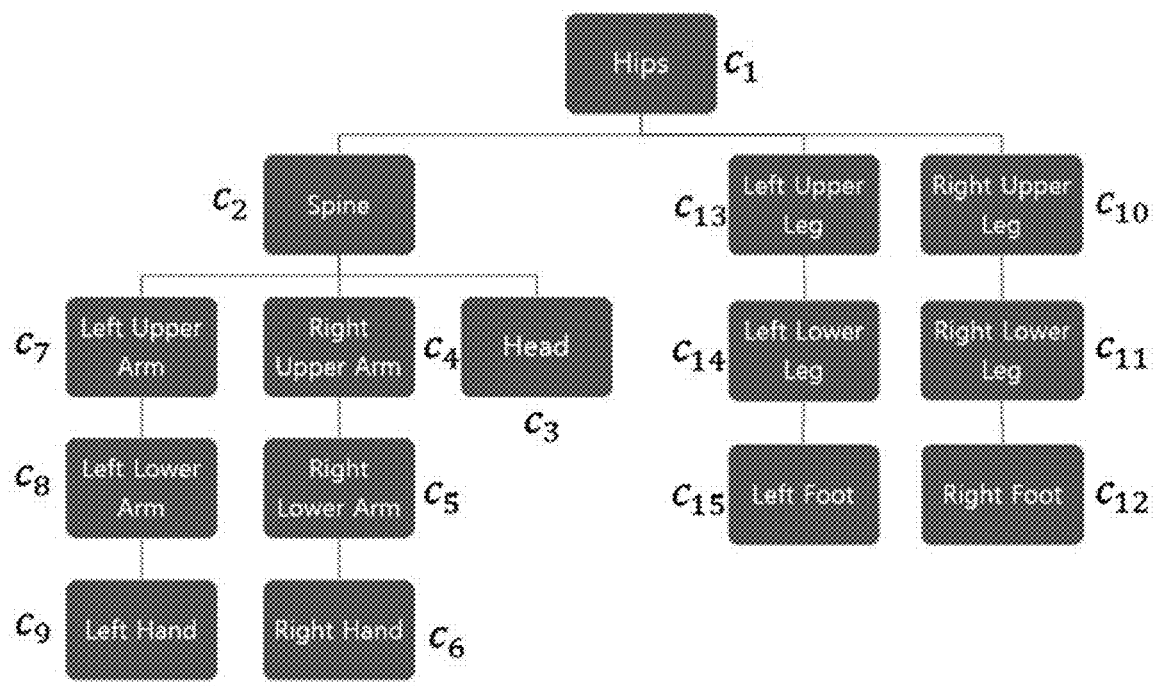

Referring to FIGS. 1 and 2, a basic structure of a 3D virtual character will be described in brief.

As shown in FIG. 1, the modeled 3D virtual character is modeled while having fifteen main body parts and one global coordinate system. Hence, the 3D virtual character has rotation-axis correlations defined, respectively, for sixteen body parts.

The rotation axis for each body part is shown in FIG. 2. It is obvious that FIGS. 1 and 2 are only an example illustrating the hierarchical structure of the body part of the 3D virtual character for the convenience of understanding and description, and the hierarchical structure may vary depending on the implementation method.

As shown in FIGS. 1 and 2, the global coordinate system of the 3D virtual character is based on a left-hand coordinate system whose Z-axis faces forwards and Y-axis faces upwards. Furthermore, FIGS. 1 and 2 illustrate the state of the local coordinate system for each body part together with symbols.

As shown in FIGS. 1 and 2, the 3D virtual character according to an embodiment of the present invention is modeled based on the hierarchical structure of the body part. Hence, the movement of the body part located at an upper layer affects the body part of a lower layer connected thereto.

According to the embodiment of the present invention, rotation data acquired from a sensor attached to the body part may be expressed in a quaternion expression method. The quaternion expression method is composed of four factors, namely, $q_0$, $q_1$, $q_2$, $q_3$. Here, $q_0$, represents a rotation angle, and $(q_1, q_2, q_3)$ represents rotation-axis vectors.

As such, it is advantageous to calculate accurate results without causing a gimbal-lock problem about any rotation by using the quaternion expression method.

In the embodiment of the present invention, the rotation value of each body part is calculated using the quaternion to implement the motion.

The basic pose of the 3D modeling is assumed to be a T-pose, and an equation for calculating the rotation of each body part is defined using two symbols, that is, Q and q.

Q represents a difference in local coordinate system between a current body part in the T-pose and a body part immediately above the current body part with quaternion. For example, referring to FIG. 2, $Q_4$ represents a difference in local coordinate system of the right upper arm part. Since there is a z-axis rotation difference of −90 degrees between $C_4$ and $C_2$ corresponding to the upper part, $Q4=(0.707, 0, 0, -707)$ may be calculated.

As another example, since $Q_5$ is equal in local coordinate system to $C_4$ that is the upper part, $Q_5=(1, 0, 0, 0)$ may be calculated. Since another bone may be added between respective body parts in the 3D modeling, the rotation values of the local coordinate system are not all the same. However, if the Q value is calculated for each body part, it is possible to implement the movement of the whole body regardless of the modeling.

q is a quaternion symbol that is assigned to each body part when the movement of the body occurs, and denotes a change in rotation value. For example, a motion tracking process for the right-hand part C6 as an example is shown in FIG. 3. In other words, the right-hand rotation equation of FIG. 3 is made from right to left. Therefore, assuming that the rotation of the hip determines the direction of the whole body, a series of rotational movements may be calculated in the order of the waist, shoulder and arm after the rotation of the hip is calculated.

Since the basic structure of the 3D virtual character has been described with reference to FIGS. 1 to 3, the method of modeling the motion of the virtual character will be described below in more detail.

Figure 4:
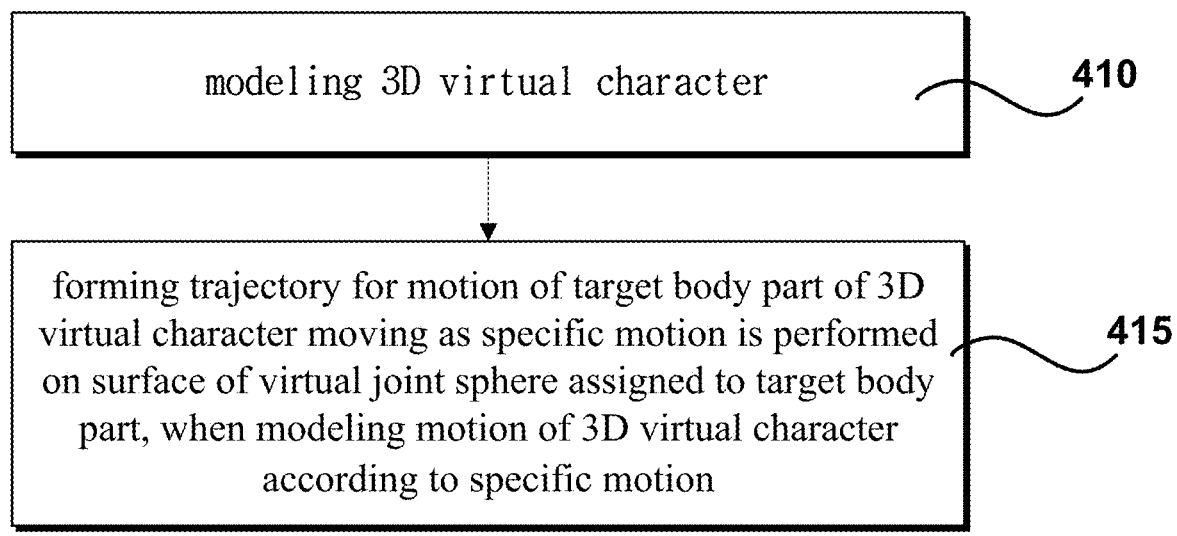
FIG. 4 is a flowchart illustrating a motion modeling method of the virtual character in accordance with the embodiment of the present invention.
Figure 5:
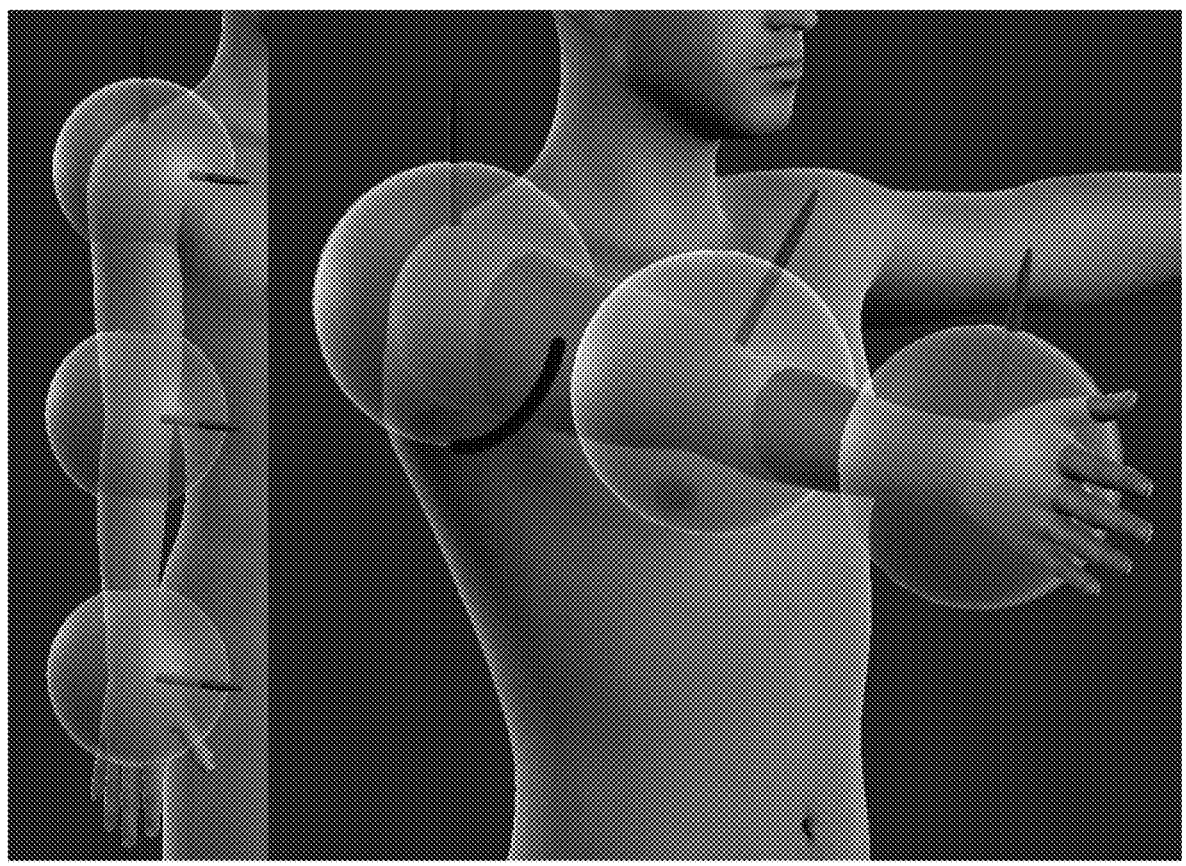
FIGS. 5 to 7 are diagrams illustrating a trajectory for a motion in accordance with the embodiment of the present invention.
Figure 6:
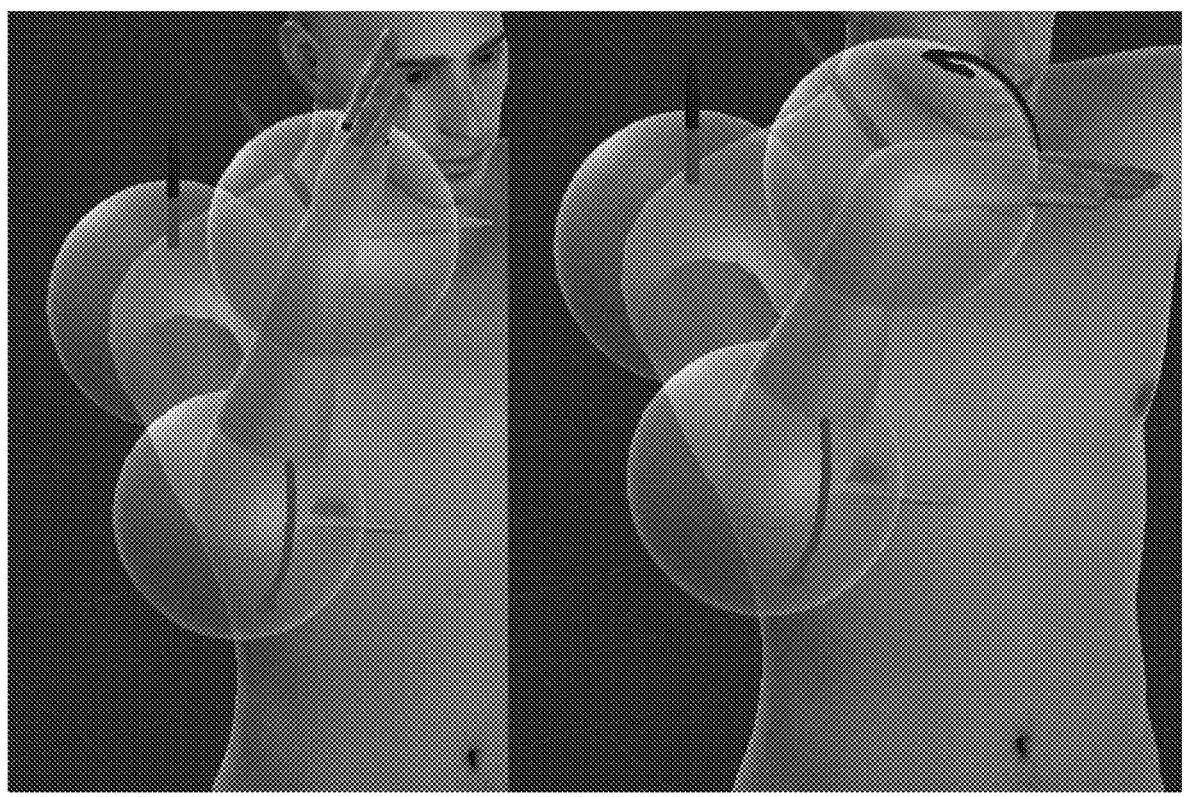
Figure 7:
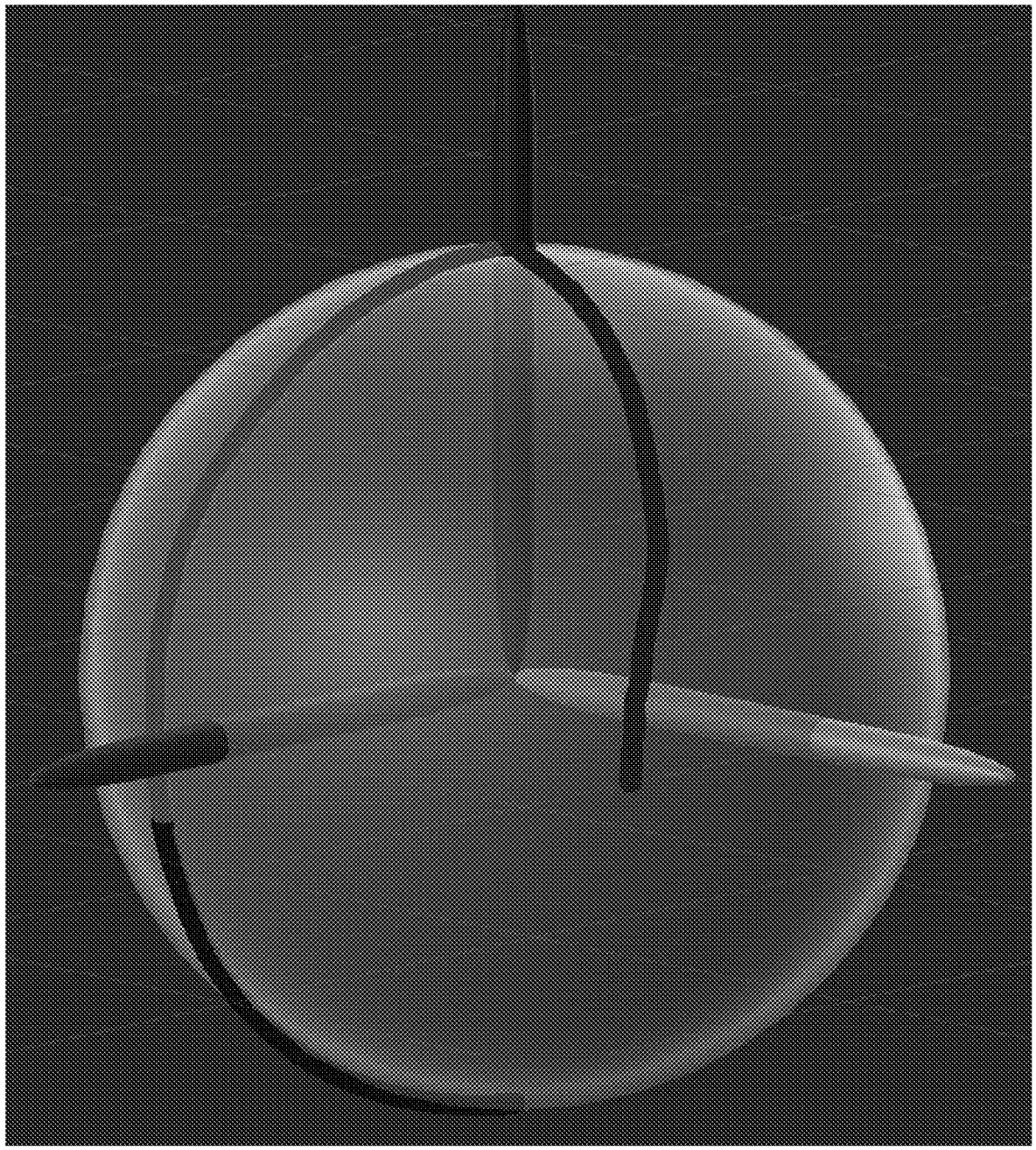
Figure 8:
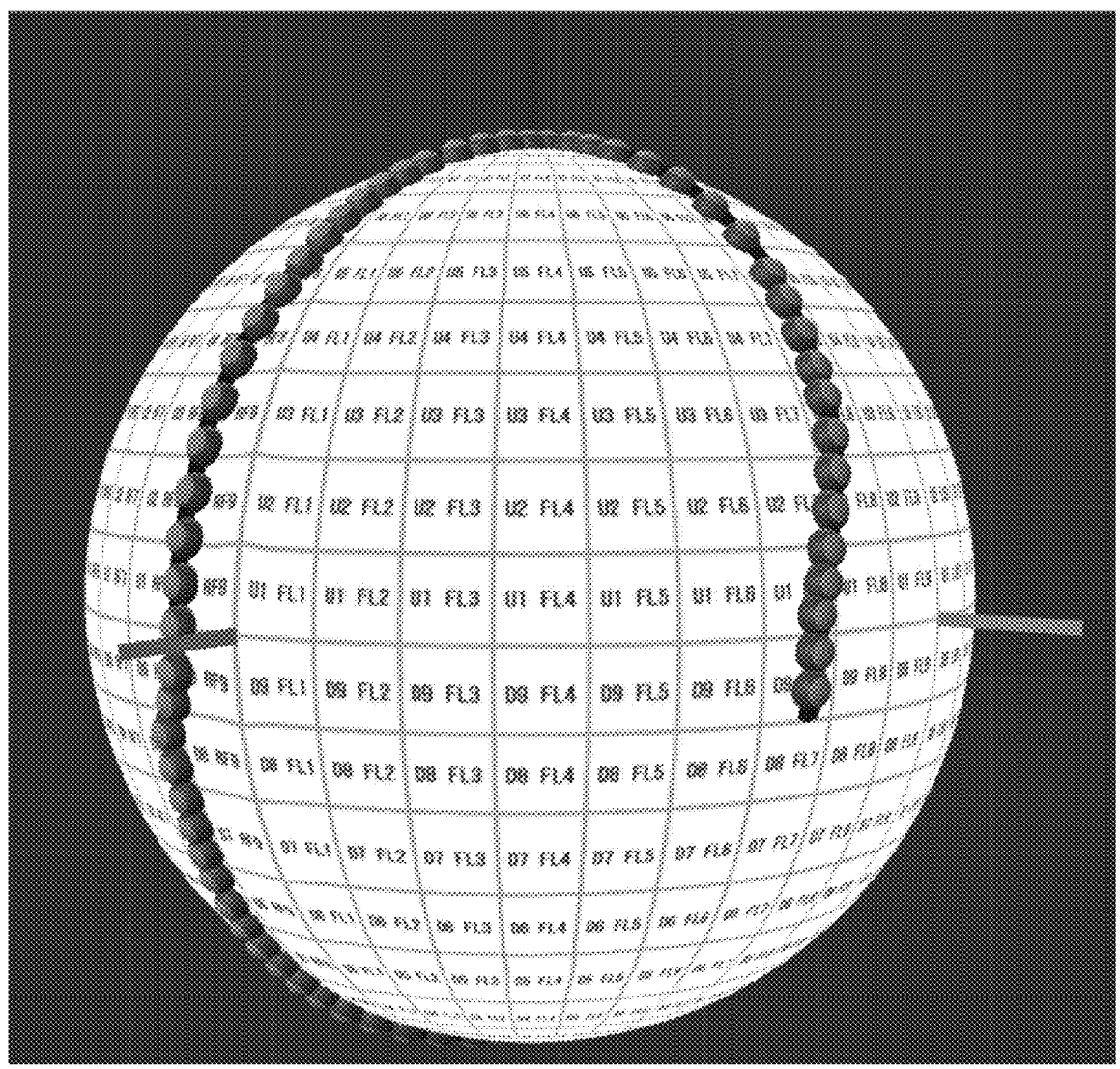
FIGS. 8 and 9 are diagrams illustrating a contact point in accordance with the embodiment of the present invention.
Figure 9:
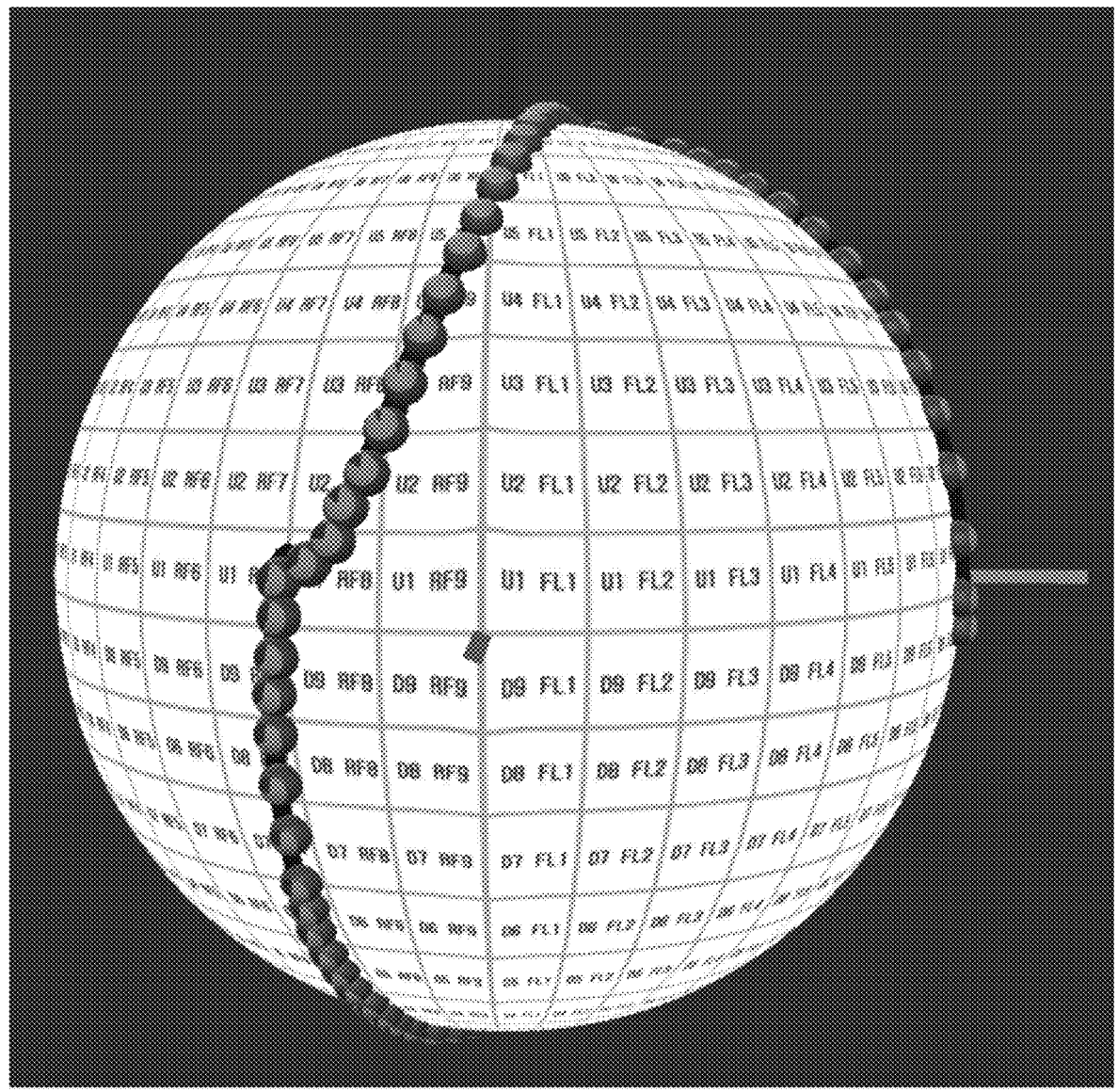

FIG. 4 is a flowchart illustrating a motion modeling method of the virtual character using the virtual joint sphere in accordance with the embodiment of the present invention, FIGS. 5 to 7 are diagrams illustrating a trajectory for a motion in accordance with the embodiment of the present invention, and FIGS. 8 and 9 are diagrams illustrating a contact point in accordance with the embodiment of the present invention At step 410, the modeling device 100 models the 3D virtual character.

As shown in FIGS. 1 to 3, the 3D virtual character is formed such that each body part has the hierarchical structure, and the virtual joint sphere is formed in each body part. Here, the virtual joint sphere may be formed at different degrees of freedom depending on the moving range of each body part. Furthermore, it is natural that the size of the virtual joint sphere formed in each body part is differently set depending on the moving range of the body part that is to be expressed.

At step 415, the modeling device 100 forms the trajectory for a motion of a target body part of the 3D virtual character moving as a specific motion is performed on the surface of the virtual joint sphere assigned to target body part, when modeling the motion of the 3D virtual character according to the specific motion That is, the modeling device 100 may form contact points, meeting on the surface of the virtual joint sphere of each body part, on the surface of the associated virtual joint sphere to visualize the trajectory of the body part according to the specific motion.

FIG. 5 is a diagram illustrating a difference in joint state (trajectory) when only the shoulder part rotates about 90 degrees from the initial pose (attention pose) according to an embodiment of the present invention. As shown in FIG. 5, if only the shoulder part rotates about 90 degrees from the initial pose, the trajectory is not changed because the lower arm and the hand part move equally.

FIG. 6 is a diagram illustrating a difference in trajectory when the lower arm and the hand part sequentially rotate about 90 degrees according to an embodiment of the present invention. As shown in FIG. 6, when the lower arm and the hand part sequentially rotate about 90 degrees, it can be seen that the trajectory is formed at a point where each part comes into contact.

In FIGS. 5 and 6, since the trajectory of each body part checks only the movement of the associated body part, it has the same meaning as rotating the joint according to the rotation value based on the local coordinate system. Therefore, in order to measure a change in all movements occurring in the specific body part (joint), it is necessary to calculate a global rotation value including the upper part affecting each body part.

In order to calculate the local rotation value of each trajectory in the same frame section, rotation values are calculated from a 0-th contact point and an i-th contact point, and then are defined as $Upper\_q_i$, $Lower\_q_i$, $Hand\_q_i$.

Subsequently, the rotation values of the affecting upper parts according to the hierarchical structure of the body are calculated in sequence. For example, if only the arm moves with the trunk being fixed, three values, namely, $Upper\_q_i$, $Lower\_q_i$, $Hand\_q_i$, are required to check the whole rotating direction of the wrist. Since the rotation values are based on the local coordinate system, calculation is performed with $Upper\_q_i * Lower\_q_i * Hand\_q_i$. Therefore, if all movements of the wrist are expressed as a trajectory pattern on the basis of the accumulated rotation values, it may be represented as shown in FIG. 7.

FIG. 8 is a diagram illustrating the surface of the virtual joint sphere. As shown in FIG. 8, the virtual joint sphere may be divided into a plurality of regions at intervals of 90 degrees around respective axes, and each region may be further divided at intervals of 10 degrees.

For example, in FIG. 8, a change in vertical height may be expressed along a blue Z-axis, and other horizontal movements may be expressed in four directions, namely, forwards, backwards, leftwards, and rightwards. Thus, as shown in FIG. 7, each region of the virtual joint sphere includes symbols meaning Front, Back, Up, Down, Left, and Right, and an angle is marked next to each symbol.

Hence, numbers attached to two consecutive symbols may represent an angle shifted from a preceding symbol region to a following symbol region. For example, an U2FL2 pattern means a region located at a position rotated 20 degrees upwards and rotated 20 degrees from front to left. Therefore, it is advantageous in that it is easy to identify what motion is made by intuitively recognizing the position of the continuously changing pattern through the symbol.

As shown in FIGS. 5 to 9, each body part of the virtual character is specified by the virtual joint sphere. Here, the size of the virtual joint sphere may be set differently depending on the moving range of the body part. That is, the moving range of the virtual joint sphere may be set differently depending on the moving range of the body part.

When modeling the motion of the virtual character using the direction vector derived for each body part, the contact points where each joint meets on the surface of the virtual joint sphere are represented by the trajectory, thus making it possible to visually express a change in movement sequentially from the initial pose.

In this regard, the contact points include a plurality of directional regions, and the directional regions may be divided into each other on the basis of a specified angle. In detail, the contact points formed on the surface of the virtual joint sphere for each body part may be formed in a circular pattern. For example, if the contact points are formed in the circular pattern, the contact points may be divided into two regions. A first region may be a clockwise region, and a second region may be a counterclockwise region. Each region may be defined in a range between 0 and 180 degrees, and may be divided into twelve sub-regions at intervals of 15 degrees.

Therefore, on the basis of the derived direction vector for each body part, the contact points may be visually displayed while filling the regions clockwise or counterclockwise. Of course, when the direction vector for the body part is not rotated, the region may not be filled with the contact point.

FIG. 9 is a diagram showing the surface of the virtual joint sphere in the motion modeling according to another embodiment of the present invention, and it can be seen that each contact point forming the trajectory of FIG. 8 does not fill the pattern region. It can be seen that rotation is not performed in the joint direction through the contact points formed on the surface of the virtual joint sphere of FIG. 8.

FIG. 9 shows the trajectory for the motion that is the same as the motion of FIG. 8 but includes the rotation in the joint direction. The upper arm part rotates 90 degrees as in FIG. 8 but the wrist rotates, so that the back of the hand faces upwards. Therefore, since the corresponding motion is a movement rotating the wrist counterclockwise, it can be seen that the region gradually expands counterclockwise on the pattern of the contact points forming the trajectory of FIG. 8. Subsequently, the motion is performed such that the lower arm part rotates again to restore to an original state, and the wrist rotates clockwise. Thereby, the pattern region of the contact points moving upwards is gradually decreased, and consequently, the contact point pattern of the same blank region as that of FIG. 8 is formed.

As such, according to the embodiment of the present invention, the contact points on the surface of the virtual joint sphere forming the trajectory divide the region to have a plurality of directional regions, and subdivide each directional region at the angular interval of 15 degrees, thus making it possible to confirm the rotating direction of the joint.

Figure 10:
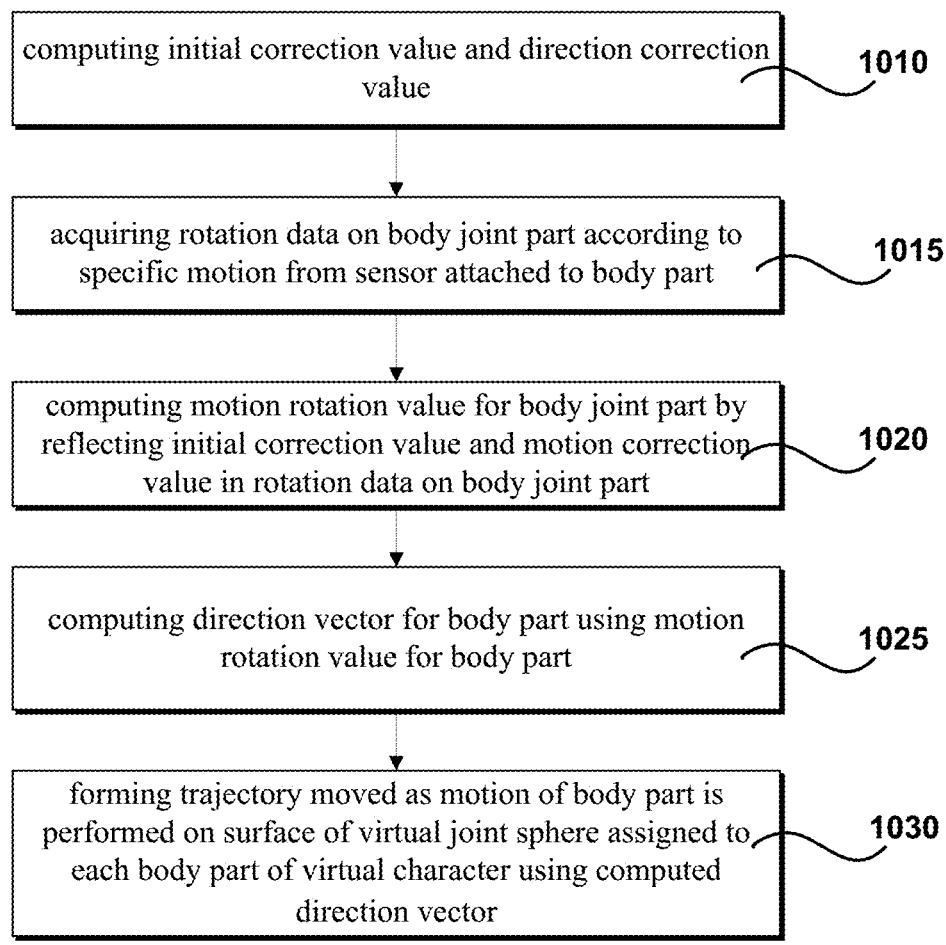
FIG. 10 is a flowchart illustrating a motion modeling method of a virtual character in accordance with another embodiment of the present invention.

FIG. 10 is a flowchart illustrating a motion modeling method of a virtual character using a sensor in accordance with another embodiment of the present invention.

At step 1010, the modeling device 100 derives the initial correction value and the direction correction value.

The sensor may be attached to each body part of a user to capture a motion, and may model the motion of the 3D virtual character using data output from the sensor according to the specific motion. In this case, even if the user performs the same motion, the sensor attached to the body part may output a different value depending on a direction in which the sensor is attached to the body. For example, the sensor may be an IMU sensor.

Therefore, an initialization process for the sensor should be preceded, before modeling the motion of the virtual character through the motion capture.

In the embodiment of the present invention, an initial correction value may be derived using rotation data acquired from the sensor in the initial pose (e.g. attention pose).

In the embodiment of the present invention, it is assumed that the IMU sensor outputs rotation data on the current rotation state on the basis of the global coordinate system. In the embodiment of the present invention, it is assumed that the rotation data output from the IMU sensor is quaternion data.

Even if the user performs the same motion, the IMU sensor may output a different value depending on a direction in which the sensor is attached to the body. Therefore, according to the embodiment of the present invention, the rotation data output from the IMU sensor is not used as it is, but the rotation data output from each frame is calibrated to be used according to the subsequent specific motion on the basis of the rotation data of the IMU sensor output from the initial state (initial pose).

In the embodiment of the present invention, this process is referred to as a sensor initialization process for convenience.

For the initialization or synchronization of the sensor, in the state where the IMU sensor is attached to the body part, a user may take the initial pose (e.g. attention pose).

To facilitate the understanding and description, the rotation data (i.e. initialization data) acquired in the initial pose is defined as $q_0$.

For convenience, the rotation data acquired in each frame according to a user's motion is defined as $q_i$.

Therefore, by multiplying an inverse value of the initialization data by the rotation data acquired in each frame, the same effect as that of initializing (synchronizing) the entire sensor can be obtained.

In summary, the modeling device 100 calibrates the rotation data acquired from the sensor after the initial pose using the initial data. This is expressed by Equation 1.

$$q_g = q_i * q_0^{-1} \quad \text{[Equation 1]}$$

Consequently, $q_g$ represents a difference in rotation value of the global coordinate system between the initial pose (attention pose) and the i-th motion.

Furthermore, after the synchronization of the sensor, the rotation data of the sensor is changed depending on the direction where the user looks. Therefore, the process of matching the entire sensor with one direction standard should be preceded regardless of a user's current direction.

In order to measure the user's current direction, the sensor is attached to the waist part and the rotation data is measured in the front direction. Further, after the rotation data ($q_n$) of the sensor when the user looks north and the rotation data ($q_f$) of the sensor in the user's current front direction are output, the direction correction value is derived using the inverse value of the rotation data ($q_n$) when the user looks north.

This is expressed by Equation 2.

$$q_{nf} = q_f * q_n^{-1} \quad \text{[Equation 2]}$$

At step 1015, the modeling device 100 acquires the rotation data on each body joint part according to the specific motion from the sensor attached to the body part.

At step 1020, the modeling device 100 derives a motion rotation value for each body joint part by reflecting an initial correction value and a motion correction value in the rotation data on the body joint part.

If the initial correction value and the direction correction value are derived, the motion rotation value may be derived by calibrating the rotation data acquired from each sensor according to the specific motion after the initial pose. This is expressed by Equation 3.

$$q_{Cal} = q_g * q_{nf}^{-1} \quad \text{[Equation 3]}$$

Consequently, the rotation data output from the sensor for each frame after the initial pose for capturing the motion may be calibrated by the initial correction value and the direction correction value, as shown by Equation 3, to be applied to each joint of the virtual character.

At step 1025, the modeling device 100 derives the direction vector ($v_j$) for each body part using the motion rotation value for each body part.

As described above, if the motion rotation value for each body part is derived, the modeling device 100 according to the embodiment of the present invention may derive the direction vector ($v_j$) after the motion is performed using the skeleton direction ($v_0$) for each body part of the initial state (pose).

This is expressed by Equation 4.

$$v_j = q_{Cal} * v_0 * q_{Cal}^{-1} \quad \text{[Equation 4]}$$

At step 1030, the modeling device 100 forms the trajectory moved as the motion of the body part is performed on the surface of the virtual joint sphere assigned to each body part of the virtual character using the derived direction vector.

Since the virtual joint sphere assigned to each body part has been described above, a duplicated description thereof will be omitted.

Figure 11:
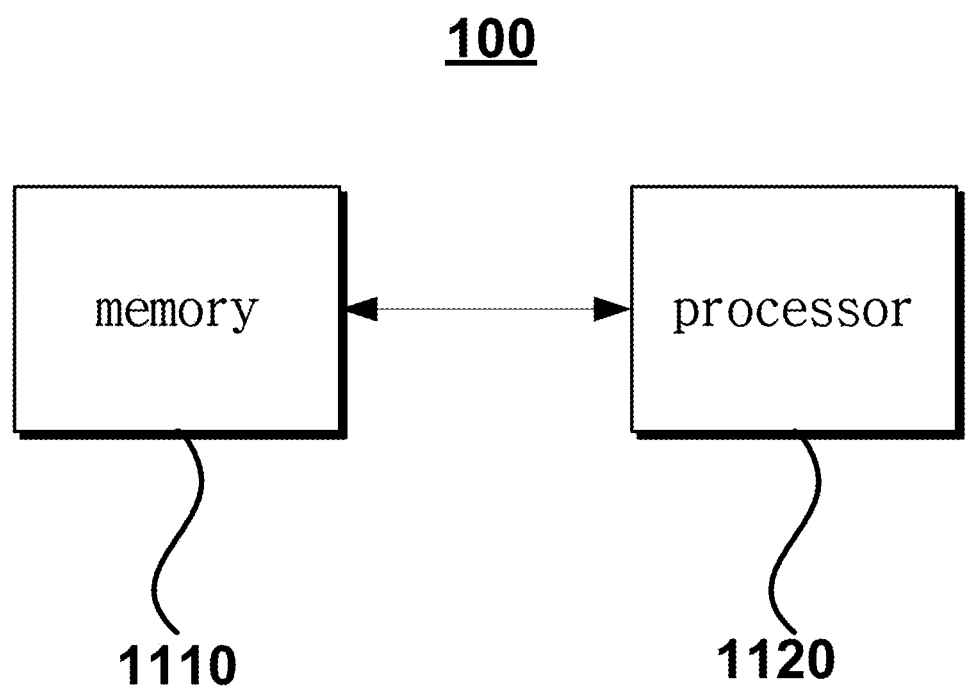
FIG. 11 is a block diagram schematically illustrating an internal configuration of the modeling device in accordance with the embodiment of the present invention.

FIG. 11 is a block diagram schematically illustrating an internal configuration of the modeling device in accordance with the embodiment of the present invention.

Referring to FIG. 11, the modeling device 100 in accordance with the embodiment of the present invention includes a memory 1110 and a processor 1120.

The memory 1110 stores at least one or more commands.

The processor 1120 is a means for executing the commands stored in the memory.

As described with reference to FIGS. 4 to 10, the commands executed by the processor 1120 may form the virtual joint sphere on each body part, derive the motion rotation value and the direction vector according to the motion of each body part, and then display the contact points meeting on the surface of the virtual joint sphere based on the derived values, thus forming the trajectory according to the motion and visually outputting the trajectory. Since this has been described above, a duplicated description thereof will be omitted.

The embodiments of the invention described above are provided merely for illustrative purposes. A person having ordinary skill in the art would be able to make various modifications, alterations, and additions without departing from the spirit and scope of the invention, and such modifications, alterations, and additions are to be regarded as being encompassed within the scope of claims set forth below.

What is claimed is:

1. A motion modeling method using a virtual sphere in an apparatus including a processor, comprising:
(a) modeling, by the processor, a 3D virtual character, wherein the 3D virtual character sets a virtual joint sphere for each body part; and
(b) forming, by the processor, a trajectory on a surface of the virtual joint sphere assigned to a target body part by displaying contact points meeting the surface of the virtual joint sphere sequentially according to movement of the target body part of the 3D virtual character when the target body part performs a specific motion,
wherein the contact points include a plurality of directional regions representing different rotation directions to identify a rotation direction of the target body part, the plurality of directional regions are divided into each other at a predetermined angle, and the plurality of directional regions are displayed in different forms of visual information in divided area of each directional region according to a direction vector of the target body part.

2. The motion modeling method of claim 1, wherein the surface of the virtual joint sphere is divided into a plurality of regions at a predetermined angle around each of axes.

3. The motion modeling method of claim 1, wherein each directional region includes symbols representing direction and an angle marked next the symbols.

4. The motion modeling method of claim 1, further comprising:
after the step (b), simultaneously moving the virtual joint sphere of a body part connected to a lower layer of a hierarchical structure of the target body part according to the motion of the target body part.

5. The motion modeling method of claim 1, wherein the trajectory is formed on the surface of the virtual joint sphere assigned to the target body part by reflecting a rotation value of a trajectory of a body part of an upper layer connected to the target body part.

6. A non-transitory computer-readable recording medium product for recording a program code to perform a method according to claim 1.

7. The motion modeling method of claim 1, wherein a size of the virtual joint sphere sets differently depending on a moving range of each body part.

8. The motion modeling method of claim 1, wherein the contact points formed on the surface of the virtual joint sphere for each body part are formed in a circular pattern.

9. A motion modeling method using a virtual sphere in an apparatus including a processor, comprising:
(a) acquiring, by the processor, rotation data on each body part according to a specific motion from a sensor attached to a person's body part; and
(b) forming, by the processor, a trajectory on a surface of a virtual joint sphere assigned to a target body part by displaying contact points meeting the surface of the virtual joint sphere sequentially according to movement of the target body part using the rotation data on each body part when the target body part performs the specific motion,
wherein the contact points include a plurality of directional regions representing different rotation directions to identify a rotation direction of the target body part, each directional region is divided into by a predetermined angle, and the plurality of directional regions are displayed in different forms of visual information in a divided area of each directional region according to a direction vector of the target body part.

10. The motion modeling method of claim 9, further comprising:
before the step (a), deriving an initial correction value and a direction correction value using the rotation data acquired from the sensor in an initial pose,
wherein the rotation data in the step (b) is a motion rotation value to which the initial correction value and the direction correction value are applied.

11. The motion modeling method of claim 9, wherein the step (b) comprises:
deriving a direction vector ($v_j$) for each body part using a skeleton direction vector ($v_0$) of each body part in the initial pose and the rotation data on each body part; and
forming the trajectory by displaying the contact points meeting the surface of the virtual joint sphere using the direction vector for each body part according to the specific motion.

12. A modeling device comprising:
a memory configured to store at least one command; and
a processor configured to execute the command stored in the memory,
wherein the command executed by the processor performs
(a) modeling a 3D virtual character, wherein the 3D virtual character sets a virtual joint sphere for each body part; and
(b) forming a trajectory on a surface of the virtual joint sphere assigned to a target body part of the 3D virtual character by displaying contact points meeting the surface of the virtual joint sphere sequentially according to movement of the target body part when the target body part performs a specific motion, wherein the contact points include a plurality of directional regions representing different rotation directions to identify a rotation direction of the target body part, each directional region is divided into by a predetermined angle, and the plurality of directional regions are displayed in different forms of visual information in a divided area of each directional region according to a direction vector of the target body part.

13. A modeling device comprising:

a memory configured to store at least one command; and a processor configured to execute the command stored in the memory, wherein the command executed by the processor performs (a) acquiring rotation data on each body part according to a specific motion from a sensor attached to a person's body part; and (b) forming a trajectory on a surface of a virtual joint sphere assigned to a target body part of a 3D virtual character by displaying contact points meeting the surface of the virtual joint sphere sequentially using the rotation data on each body part when the target body part performs a specific motion, wherein the contact points include a plurality of directional regions representing different rotation directions so that a rotation direction of the target body part can be identified, and each directional region is divided into a predetermined angle, and are displayed in different forms of visual information in a divided area of each directional region according to the direction vector of the target body part.

* * * * *